(12) United States Patent
Krishnamoorthy et al.

(10) Patent No.: US 8,755,655 B2
(45) Date of Patent: Jun. 17, 2014

(54) EDGE-COUPLED OPTICAL PROXIMITY COMMUNICATION

(75) Inventors: Ashok V. Krishnamoorthy, San Diego, CA (US); Xuezhe Zheng, San Diego, CA (US)

(73) Assignee: Oracle America, Inc., Redwood Shores, CA (US)

( * ) Notice: Subject to any disclaimer, the term of this patent is extended or adjusted under 35 U.S.C. 154(b) by 231 days.

(21) Appl. No.: 12/564,701

(22) Filed: Sep. 22, 2009

(65) Prior Publication Data

US 2011/0069973 A1 Mar. 24, 2011

(51) Int. Cl.
*G02B 6/36* (2006.01)
*G02B 6/30* (2006.01)
*G02B 6/42* (2006.01)
*G02B 6/43* (2006.01)

(52) U.S. Cl.
CPC ...... *G02B 6/423* (2013.01); *G02B 6/43* (2013.01); *G02B 6/30* (2013.01); *G02B 6/4228* (2013.01)
USPC .............................................. 385/52; 385/14

(58) Field of Classification Search
USPC ..................... 385/52; 398/156, 164
See application file for complete search history.

(56) References Cited

U.S. PATENT DOCUMENTS

| | | | | |
|---|---|---|---|---|
| 4,809,358 A | * | 2/1989 | Fernstrom | 398/164 |
| 5,054,870 A | * | 10/1991 | Losch et al. | 385/14 |
| 5,208,879 A | * | 5/1993 | Gallo et al. | 385/14 |
| 5,313,536 A | * | 5/1994 | Rossi et al. | 385/14 |
| 5,371,820 A | * | 12/1994 | Welbourn et al. | 385/76 |
| 5,375,184 A | * | 12/1994 | Sullivan | 385/129 |
| 5,432,878 A | * | 7/1995 | Smous | 385/52 |
| 5,521,992 A | * | 5/1996 | Chun et al. | 385/14 |
| 5,534,442 A | * | 7/1996 | Parker et al. | 438/25 |
| 5,568,575 A | * | 10/1996 | Sato | 385/16 |
| 5,687,267 A | * | 11/1997 | Uchida | 385/89 |
| 5,703,973 A | * | 12/1997 | Mettler et al. | 385/14 |
| 5,818,984 A | * | 10/1998 | Ahmad et al. | 385/14 |

(Continued)

FOREIGN PATENT DOCUMENTS

JP 63291014 A * 11/1988
JP 07151940 A * 6/1995

OTHER PUBLICATIONS

Krishnamoorthy, Ashok V. et al., "Optical Proximity Communication With Passively Aligned Silicon Photonic Chips", pp. 409-414, IEEE Journal of Quantum Electronics, vol. 45, No. 4, Apr. 2009.

(Continued)

*Primary Examiner* — Michelle R Connelly
(74) *Attorney, Agent, or Firm* — Park, Vaughan, Fleming & Dowler LLP; Steven E. Stupp (57) ABSTRACT

An optical module is described. This optical module includes at least two optical devices that communicate with each other using edge-to-edge optical coupling of an optical signal between optical components in the two optical devices. Note that the edge-to-edge optical coupling may occur without mode converters at edges of either of the optical devices. Furthermore, the edge-to-edge optical coupling may be facilitated by an alignment substrate, which is mechanically coupled to the two optical devices. This alignment substrate aligns the edges of the two optical devices so that they are approximately parallel to each other, and aligns the optical components in the two optical devices.

20 Claims, 7 Drawing Sheets

(56) References Cited

U.S. PATENT DOCUMENTS

| | | | |
|---|---|---|---|
| 5,909,524 A * | 6/1999 | Tabuchi | 385/49 |
| 5,978,531 A * | 11/1999 | Funabashi | 385/45 |
| 6,012,855 A * | 1/2000 | Hahn | 385/89 |
| 6,052,500 A * | 4/2000 | Takano et al. | 385/50 |
| 6,118,917 A * | 9/2000 | Lee et al. | 385/49 |
| 6,151,430 A * | 11/2000 | Traver et al. | 385/14 |
| 6,160,936 A * | 12/2000 | You et al. | 385/49 |
| 6,238,100 B1 * | 5/2001 | Sasaki et al. | 385/59 |
| 6,324,314 B1 * | 11/2001 | Ukechi et al. | 385/14 |
| 6,741,776 B2 * | 5/2004 | Iwashita et al. | 385/49 |
| 6,757,453 B2 * | 6/2004 | Nekado et al. | 385/14 |
| 6,842,552 B1 * | 1/2005 | Steinberg et al. | 385/16 |
| 6,922,508 B2 * | 7/2005 | Glebov et al. | 385/43 |
| 7,021,837 B2 * | 4/2006 | Eichenberger et al. | 385/89 |
| 7,113,683 B2 * | 9/2006 | Hayamizu et al. | |
| 7,519,245 B2 * | 4/2009 | Bresniker et al. | 385/14 |
| 7,574,077 B2 | 8/2009 | Zheng | |
| 7,587,108 B2 * | 9/2009 | Carpenter et al. | 385/49 |
| 2003/0152338 A1 * | 8/2003 | Kuhara et al. | 385/89 |
| 2003/0223707 A1 * | 12/2003 | Nakanishi et al. | 385/92 |
| 2004/0017978 A1 * | 1/2004 | Kuhara et al. | 385/49 |
| 2004/0190831 A1 * | 9/2004 | Lu et al. | 385/49 |
| 2006/0050493 A1 * | 3/2006 | Hamasaki et al. | 361/767 |
| 2006/0269288 A1 * | 11/2006 | Guidotti et al. | 398/135 |
| 2006/0291782 A1 * | 12/2006 | Carpenter et al. | 385/49 |
| 2007/0127865 A1 * | 6/2007 | Lu et al. | 385/14 |
| 2008/0226222 A1 * | 9/2008 | Kim et al. | 385/14 |
| 2011/0026875 A1 * | 2/2011 | Bowen | 385/14 |

OTHER PUBLICATIONS

Taillaert, Dirk et al., "An Out-of-Plane Grating Coupler for Efficient Butt-Coupling Between Compact Planar Waveguides and Single-Mode Fibers", pp. 949-955, IEEE Journal of Quantum Electronics, vol. 38, No. 7, Jul. 2002.

Almeida, Vilson R. et al., "Nanotaper for Compact Mode Conversion", pp. 1302-1304, Optics Letters vol. 28, No. 15, Aug. 1, 2003.

Smith, B. Thomas et al., "Fundamentals of Silicon Photonic Devices", White paper, Kotura Inc., http://kotura.com/pdf/koturafundamentals_of_silicon_photonic_devices.pdf, downloaded Sep. 25, 2009.

Smith, B. Thomas et al., "Integrated Silicon Photonic Circuit: Monolithic 8-Channel Modulator, Tap, Vertical Coupler, and Flip-Chip Mounted Photodetector Array", white paper, Kotura Inc., http://www.kotura.com/technology/docs.html, downloaded Sep. 25, 2009.

* cited by examiner

```
┌─────────────────────────────────────────────────────────────┐
│  MECHANICALLY COUPLE A FIRST OPTICAL DEVICE TO AN ALIGNMENT │
│                          SUBSTRATE                           │
│                             710                              │
└─────────────────────────────────────────────────────────────┘
                               │
                               ▼
┌─────────────────────────────────────────────────────────────┐
│ MECHANICALLY COUPLE A SECOND OPTICAL DEVICE TO THE ALIGNMENT│
│ SUBSTRATE, THEREBY FACILITATING OPTICAL COUPLING OF AN OPTICAL│
│  SIGNAL BETWEEN THE FIRST OPTICAL COMPONENT AND THE SECOND  │
│                      OPTICAL COMPONENT                       │
│                             712                              │
└─────────────────────────────────────────────────────────────┘
```

FIG. 7

EDGE-COUPLED OPTICAL PROXIMITY COMMUNICATION

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure relates to techniques for communicating optical signals. More specifically, the present disclosure relates to an optical module and an associated technique for edge-to-edge coupling of optical signals between chips.

2. Related Art

Many existing optical modules use on-chip optical waveguides to communicate optical signals. For example, in a proposed optical module chips are oriented face-to-face. In this configuration, optical signals may be optically coupled between the chips in a direction normal to the surface of the chips (i.e., in a direction out of the planes of the chips) using mirrors or grating couplers, which are positioned at the ends of the on-chip optical waveguides. Note that this optical coupling is sometimes referred to as 'optical proximity communication.' However, using face-up and face-down chips in this proposed optical module can significantly increase packaging complexity and cost, especially if the face-up and face-down chips are relatively large, and also if the chips include optical waveguides fabricated on silicon substrates using silicon-on-insulator technology.

An alternative to using face-up and face-down chips is to couple the optical signals between the chips via optical fibers. For example, in the plane of a chip, an optical fiber may be aligned with an on-chip optical waveguide by using a tapered or an inverse tapered optical fiber at the edge of the chip. In order to allow sharp turns in the routing of the optical waveguides on silicon substrates, these optical waveguides typically have modes with a small spatial extent (which are close to the diffraction limit). These modes are facilitated by the strong confinement associated with the large index of refraction difference between the waveguide core and surrounding cladding materials. However, because an optical beam diverges quickly as leaves such an optical waveguide (which is referred to as mode mismatch), it can be difficult to achieve low-loss, edge-to-edge optical coupling.

In some existing chips, the optical losses associated with mode mismatch can be alleviated by using mode converters between aligned optical waveguides. For example, a mode converter with a 3-dimensional mode taper or nano-taper at the end of an optical waveguide can convert a sub-micron waveguide mode into an optical-fiber-sized mode. In the process, the mode converters can increase the optical coupling distance at an edge of a chip by up to a few tens of micrometers without significant mode-mismatch loss.

However, mode converters increase the cost and complexity of chips. In addition, for the mode converters to effectively couple the optical signals between chips, the optical waveguides on these chips still need to be aligned. Furthermore, this alignment needs to be maintained, even in the presence of disturbances, such as: thermal expansion, vibration and shock. Consequently, direct coupling of optical signals between chips in optical modules remains challenging.

Hence, what is needed is an optical module without the above-described problems.

SUMMARY

One embodiment of the present disclosure provides an optical module that includes: a first optical device, a second optical device and an alignment substrate. The first optical device includes a first substrate having a first surface and a first edge, which is substantially perpendicular to the first surface, and a first optical component that is disposed on the first surface. Furthermore, the second optical device has a second edge, which is substantially parallel to the first edge, where the second optical device includes a second optical component. Additionally, the alignment substrate, which is mechanically coupled to the first substrate and the second optical device, aligns the first edge and the second edge, thereby facilitating optical coupling of an optical signal between the first optical component and the second optical component along a direction that is substantially perpendicular to the first edge and the second edge.

Note that the first optical component and the second optical component may include waveguides. Furthermore, the optical coupling between the first optical component and the second optical component may occur without mode converters at either the first edge or the second edge (for example, if the first and second optical components are optical waveguides with mode sizes of a few microns). However, if the first and second optical components are optical waveguides with sub-micron mode sizes, then mode converters may be used at the first and second edges to reduce optical losses.

In some embodiments, the second optical device includes a second substrate having a second surface and the second edge, which is substantially perpendicular to the second surface. Moreover, the second optical component may be disposed on the second surface.

In some embodiments, the second optical device includes a fiber ribbon. This fiber ribbon may have a third edge on an opposite side of the fiber ribbon from the second edge. In addition, the optical module may include a routing chip, having a fourth edge that is substantially parallel to the third edge. This routing chip may route the optical signal to a third optical device. Moreover, the alignment substrate, which is mechanically coupled to the routing chip, may align the third edge and the fourth edge, thereby facilitating optical coupling of the optical signal between the second optical component and the routing chip along a direction that is substantially perpendicular to the third edge and the fourth edge.

In some embodiments, the second optical device includes the routing chip, which routes the optical signal to a third optical device. In these embodiments, the second optical device may have the third edge on another side of the second optical device than the second edge. In addition, the third optical device may include a third substrate having a third surface and a fourth edge, which is substantially perpendicular to the third surface, and which is substantially parallel to the third edge. Moreover, a third optical component may be disposed on the third surface. Note that the alignment substrate, which is mechanically coupled to the third optical device, may align the third edge and the fourth edge, thereby facilitating optical coupling of an optical signal between the second optical component and the third optical component along a direction that is substantially perpendicular to the third edge and the fourth edge.

Note that the mechanical coupling of the first substrate and the alignment substrate is facilitated by a negative feature recessed below at least one of opposing surfaces of the first substrate and the alignment substrate, where the negative feature has an opening, defined by an edge, in at least one of the opposing surfaces. Furthermore, the mechanical coupling of the first substrate and the alignment substrate may be facilitated by a positive feature that at least in part mates with the negative feature. This positive feature may include a spherically shaped mechanical coupling component. In some embodiments, the mechanical coupling of the first substrate and the alignment substrate is facilitated by negative features recessed below both opposing surfaces of the first substrate and the alignment substrate, where the negative features have openings, defined by edges, in both of the opposing surfaces.

Another embodiment provides a system that includes the optical module.

Another embodiment provides a method for assembling an optical module. During this method, the first optical device is mechanically coupled to the alignment substrate. Moreover, the first optical device includes the first substrate having the first surface and the first edge, which is substantially perpendicular to the first surface, and the first optical component disposed on the first surface. Then, the second optical device is mechanically coupled to the alignment substrate, where the second optical device has the second edge, which is substantially parallel to the first edge, and the second optical device includes the second optical component. Note that the alignment substrate aligns the first edge and the second edge, thereby facilitating optical coupling of the optical signal between the first optical component and the second optical component along the direction that is substantially perpendicular to the first edge and the second edge.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

The following description is presented to enable any person skilled in the art to make and use the disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Embodiments of an optical module, a system that includes the optical module, and a technique for assembling the optical module are described. This optical module includes at least two optical devices that communicate with each other using edge-to-edge optical coupling of an optical signal between optical components in the two optical devices. Note that the edge-to-edge optical coupling may occur without mode converters at edges of either of the optical devices (for example, if the optical components are optical waveguides with mode sizes of a few microns). However, if the optical components are optical waveguides with sub-micron mode sizes, then mode converters may be used at the edges of the optical devices to reduce optical losses. Furthermore, the edge-to-edge optical coupling may be facilitated by an alignment substrate, which is mechanically coupled to the two optical devices. This alignment substrate aligns the edges of the two optical devices so that they are approximately parallel to each other, and aligns the optical components in the two optical devices.

By aligning the optical components and the optical devices, this alignment technique may reduce the cost and the complexity of the optical module. In particular, the optical devices may include substrates that are positioned side-by-side in the optical module. Consequently, instead of using face-up and face-down chips, the optical module may utilize a single type of chip (such as a face-up chip), which may have optical components deposited or disposed only on one side or surface. Thus, the optical module and the alignment technique may facilitate integration of multiple chips in the optical module.

Figure 1:
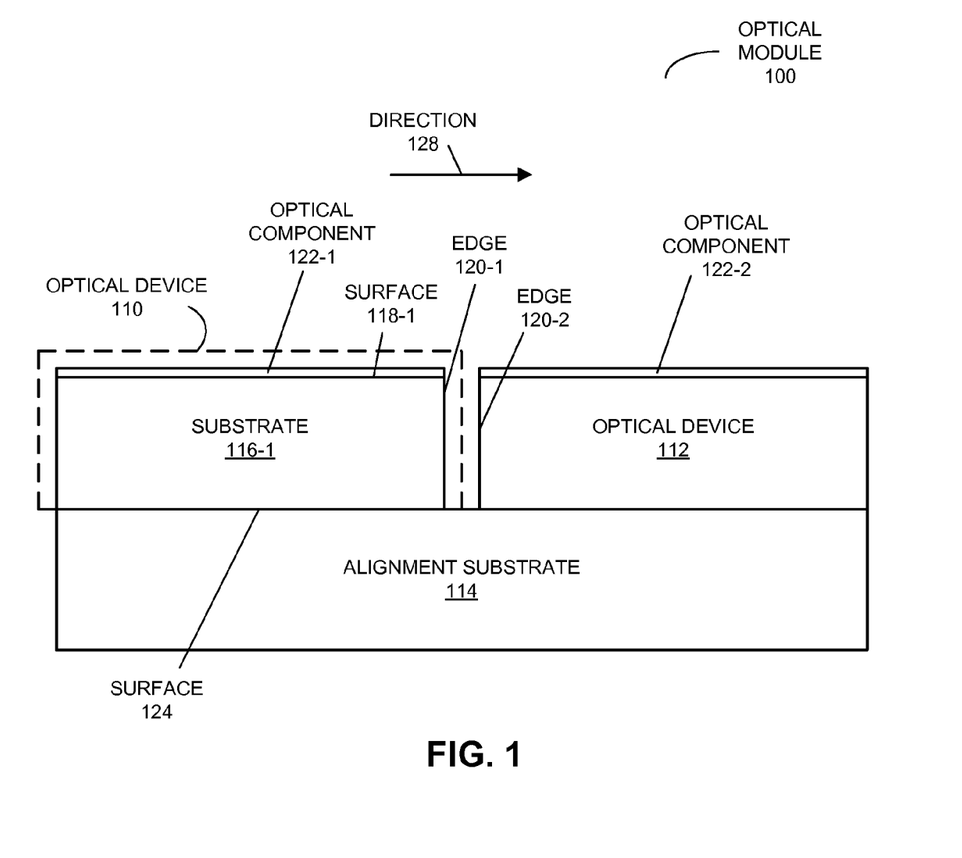
FIG. 1 is a block diagram illustrating an optical module in accordance with an embodiment of the present disclosure.

We now describe embodiments of an optical module. FIG. 1 presents a block diagram illustrating a cross-sectional view of an optical module 100. This optical module includes optical devices 110 and 112, and an alignment substrate 114. Optical device 110 includes substrate 116-1 having a surface 118-1 and an edge 120-1, which is substantially perpendicular to the surface 118-1. Moreover, optical component 122-1 is disposed on surface 118-1.

Furthermore, optical device 112 has an edge 120-2, which is substantially parallel to edge 120-1, and optical device 112 includes optical component 122-2. Additionally, alignment substrate 114, having surface 124, is mechanically coupled to substrate 116-1 and optical device 112. This mechanical coupling aligns edges 120, and aligns optical components 122, thereby facilitating optical coupling of an optical signal between optical devices 110 and 112 along a direction 128 that is substantially perpendicular to edges 120 (i.e., edge-to-edge optical coupling).

Note that optical components 122-1 and 122-2 may include: an optical source (such as a laser), an optical modulator, an optical multiplexer (such as an add filter), an optical de-multiplexer (such as a drop filter), an optical filter, an optical switch and/or an optical waveguide. For example, an optical waveguide may be deposited or disposed on a semiconductor substrate (such as substrate 116-1). In some embodiments, this optical waveguide may be fabricated using silicon-on-insulator technology (e.g., substrate 116-1 may be a silicon substrate). Furthermore, the optical coupling between optical components 122-1 and 122-2 may occur without mode converters at either edge 120-1 or edge 120-2 (for example, if optical components 122 are optical waveguides with mode sizes of a few microns). Thus, on-chip optical signals may be able to exit edge 120-1 of chip or substrate 116-1 in optical device 110 naturally via an optical waveguide. (However, if optical components 122 are optical waveguides with sub-micron mode sizes, then mode converters may be used at edges 122 to reduce optical losses.) Furthermore, the optical waveguides in optical devices 110 and 112 may act as both light emitters and collectors.

Figure 2:
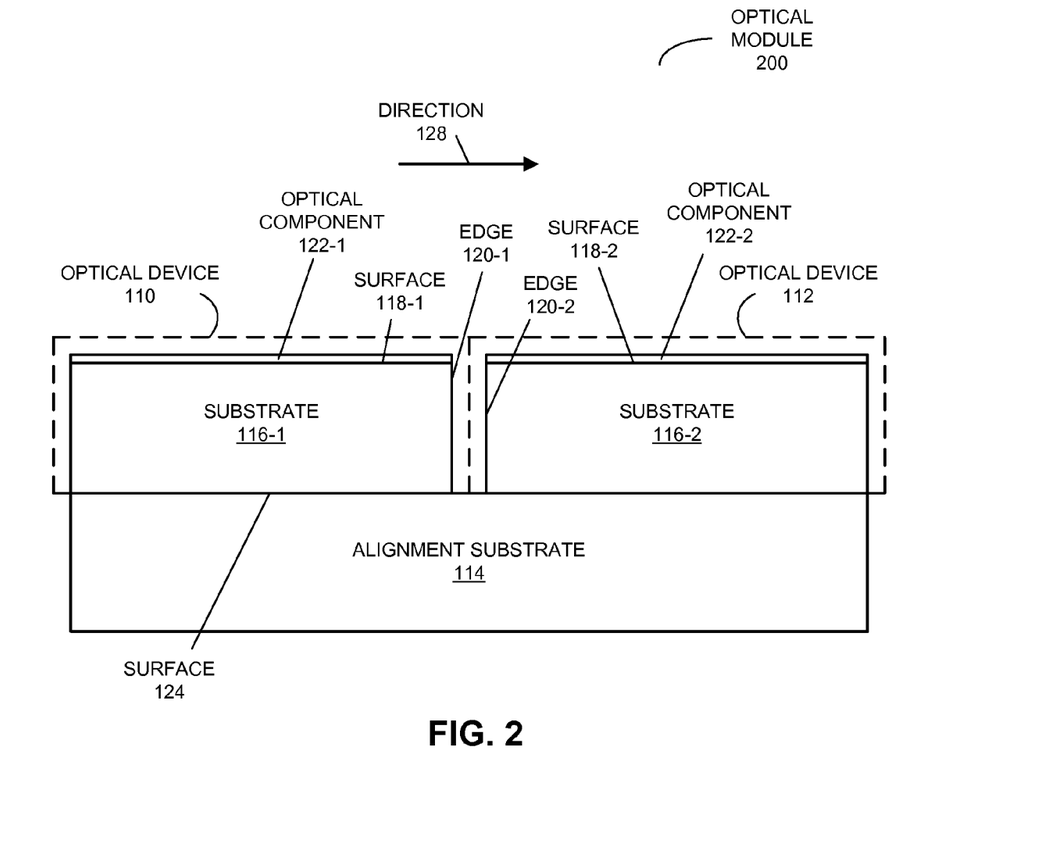
FIG. 2 is a block diagram illustrating an optical module in accordance with an embodiment of the present disclosure.

In some embodiments, optical device 112 includes a substrate or a chip. This is shown in FIG. 2, which presents a block diagram illustrating a cross-sectional view of an optical module 200. In particular, in this optical module optical device 112 includes a substrate 116-2 having a surface 118-2 and edge 120-2, which is substantially perpendicular to surface 118-2, and optical component 122-2 is disposed on surface 118-2. By placing two substrates 116 or chips in close proximity to each other in this way, and by aligning the optical components 122 (such as optical waveguides) on both chips along proximate edges 120, optical signals from one chip can be transported to the other via the aligned optical waveguides, thereby providing a data-communication link by optically interconnecting the two chips. For example, substrate 116-1 may be a transmitting chip, and substrate 116-2 may be a receiving chip (or a relay chip that transports the optical signals to a final receiving chip). Moreover, this configuration may allow light to be directly coupled from one chip to the other. Note that this edge-based optical coupling is similar to optical proximity communication. Consequently, it is sometimes referred to as 'edge-to-edge optical proximity coupling.'

In some embodiments, substrate 116-1 is optically coupled to one or more optical fibers, such as a fiber ribbon. For example, an array of optical fibers may be pre-aligned with substrate 116-1 by placing the optical fibers into v-shaped grooves along edge 120-1 (this approach could also be used to extend the spacing between the chips). Alternatively, the optical fibers may be attached to connectors, which may allow the chips to be individually packaged prior to connecting them via the connectors and optical fibers (which is sometimes referred to as a 'virtual macro-chip').

Figure 3:
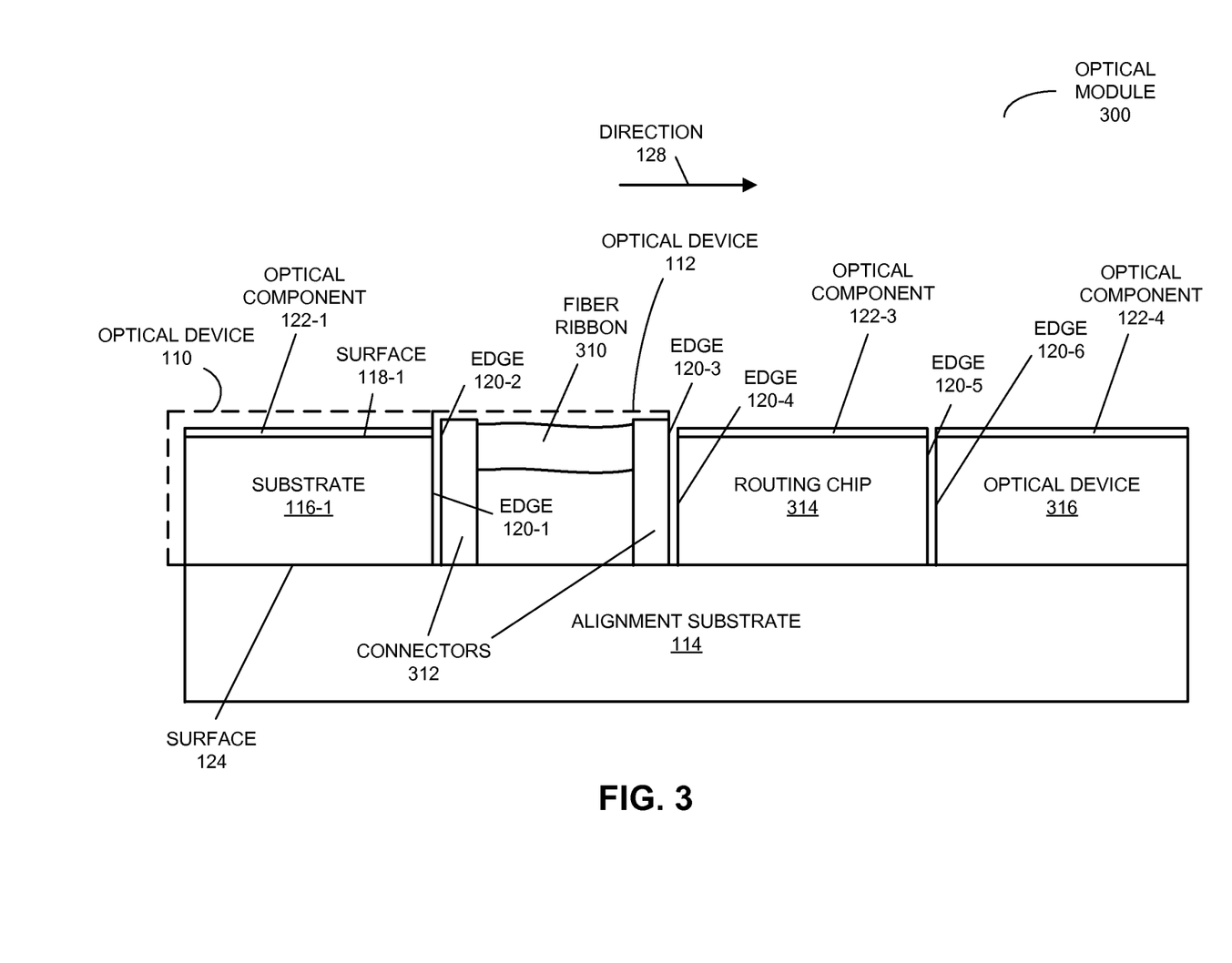
FIG. 3 is a block diagram illustrating an optical module in accordance with an embodiment of the present disclosure.

FIG. 3 presents a block diagram illustrating a cross-sectional view of an optical module 300. In this optical module, optical device 112 includes a fiber ribbon 310 and connectors 312. This fiber ribbon may have an edge 120-3 on an opposite side of fiber ribbon 310 from edge 120-2.

In addition, optical module 300 may include a routing chip 314, having an edge 120-4 that is substantially parallel to edge 120-3. This routing chip may route the optical signal to optical device 316. Moreover, alignment substrate 114, which is mechanically coupled to routing chip 314, may align edges 120-3 and 120-4, and may align one or more optical fibers in fiber ribbon 310 with one or more corresponding optical components (such as optical component 122-3) on routing chip 314, thereby facilitating optical coupling of the optical signals between optical device 112 and routing chip 314 along a direction that is substantially perpendicular to edges 120-3 and 120-4 (such as direction 128). Similarly, alignment substrate 114 may be mechanically coupled to optical device 316, and may align edges 120-5 and 120-6 of routing chip 314 and optical device 316, thereby facilitating edge-to-edge optical coupling of the optical signal between these components.

Note that routing chip 314 may selectively route optical signals to and from chips in an array of chips. Furthermore, routing chip 314 may include: multiplexing, demultiplexing, add, drop, monitoring, amplification, switching and/or other functionality. Additionally, to avoid waveguide crossings, routing chip 314 may include two or more routing-wafer layers with face-to-face optical proximity communication between optical connectors in these layers.

Figure 4:
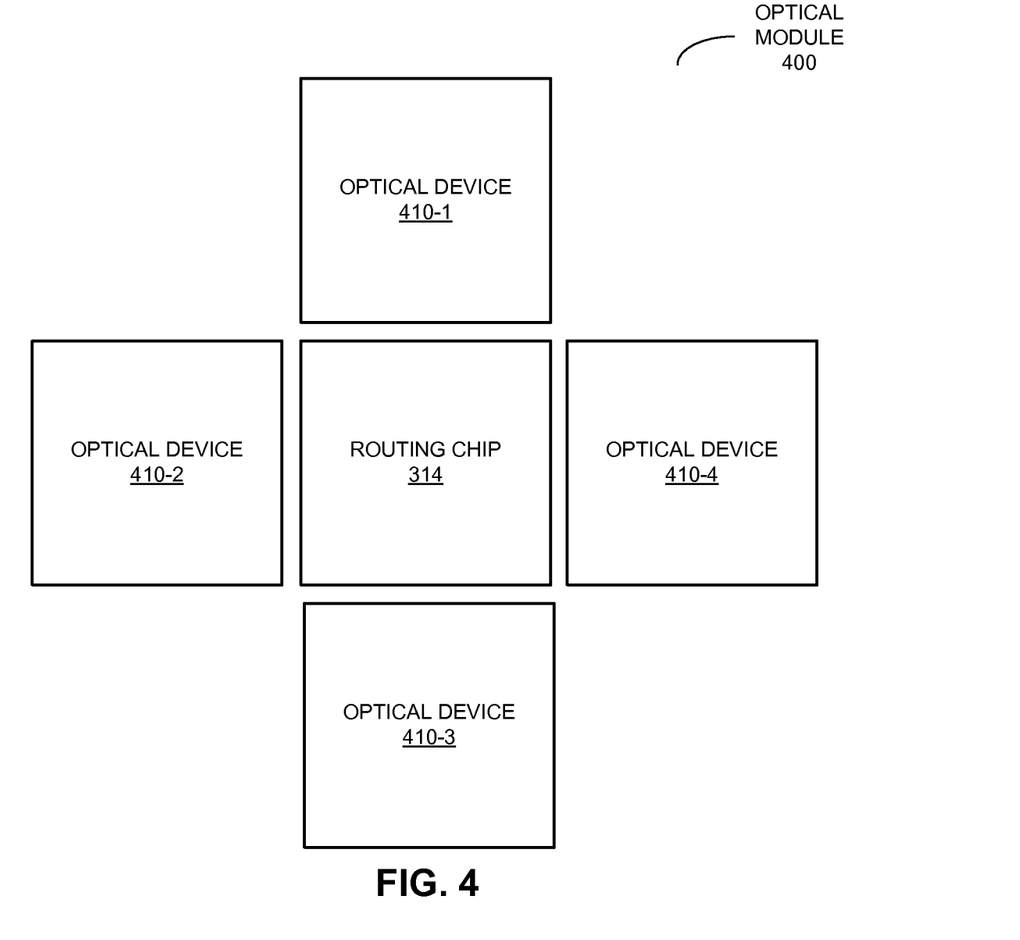
FIG. 4 is a block diagram illustrating an optical module in accordance with an embodiment of the present disclosure.

In some embodiments, multiple chips are edge-to-edge optically coupled to routing chip 314 without using intervening fiber ribbons, such as fiber ribbon 310. For example, four or more chips may be optically coupled to edges of routing chip 314. This is shown in FIG. 4, which presents a block diagram illustrating a top view of an optical module 400. In this optical module, routing chip 314 routes optical signals between optical device 410 (which may be multiple instances of optical device 110 in FIG. 1). Once again, mechanical coupling of these optical devices and routing chip 314 to alignment substrate 114 (FIG. 3) may align edges 120 (FIGS. 1-3) and the optical components 122 (FIG. 1-3) disposed on optical devices 410 and routing chip 314, thereby facilitating edge-to-edge optical coupling of the optical signal between these components.

Figure 5:
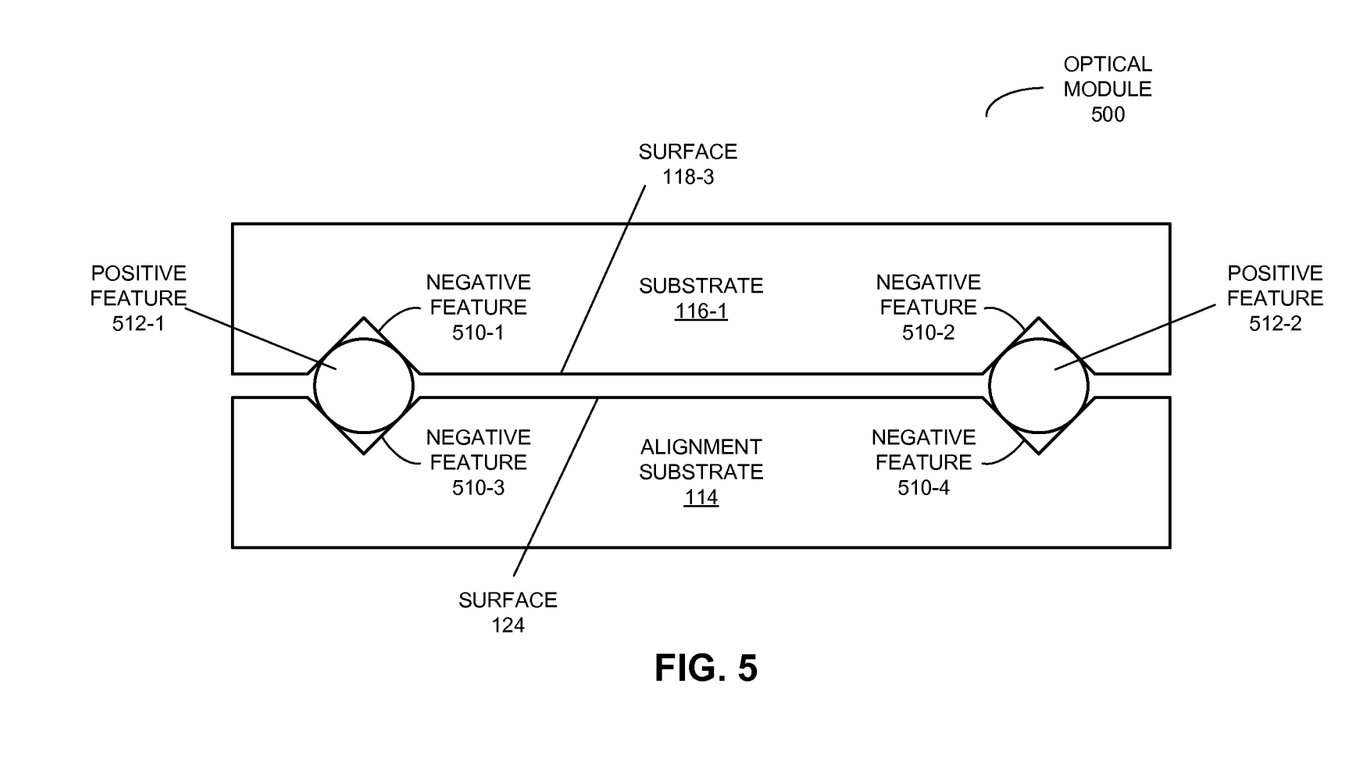
FIG. 5 is a block diagram illustrating an optical module in accordance with an embodiment of the present disclosure.

As noted in the discussion of the preceding embodiments, edge-to-edge optical proximity communication is facilitated by the alignment of the facing edges 120 (FIGS. 1-3) of substrates 116 (FIGS. 1-3) and the alignment of optical components 122 (FIGS. 1-3) in or on the optical devices. This alignment is facilitated by alignment substrate 114 (FIGS. 1-3). In particular, alignment substrate 114 (FIGS. 1-3) may include alignment features that mate with corresponding alignment features on substrates 116 (FIGS. 1-3) and/or that mate with one or more intervening alignment features (which may not be on the substrates). In this way, alignment substrate 114 (FIGS. 1-3) may align these components relative to alignment substrate 114 (FIGS. 1-3) and, by extension, relative to each other. Furthermore, alignment substrate 114 (FIGS. 1-3) may maintain the alignment, even in the presence of disturbances, such as: thermal expansion, vibration and/or shock FIG. 5 presents a block diagram illustrating a cross-sectional view of an optical module 500. In this optical module, the mechanical coupling of a given substrate in a given optical device, such as substrate 116-1, and alignment substrate 114 may be facilitated by a negative feature recessed below at least one of opposing surfaces 118-3 and 124. For example, negative feature 510-1 has an opening, defined by an edge, in surface 118-3. Furthermore, the mechanical coupling of substrate 116-1 and alignment substrate 114 may be facilitated by a positive feature, such as positive feature 512-1 that at least in part mates with negative feature 510-1. In some embodiments, this positive feature may include a spherically shaped mechanical coupling component, which may be deposited or disposed on surface 124. Alternatively, the negative feature may be defined on surface 124, and the positive feature may be defined on surface 118-3.

As shown in FIG. 5, in some embodiments the mechanical coupling of substrate 116-1 and alignment substrate 114 is facilitated by negative features 510 recessed below both opposing surfaces 118-3 and 124 of substrate 116-1 and alignment substrate 114. These negative features may have openings, defined by edges, in both of the opposing surfaces. In this embodiment, positive features 512 may include balls, and negative features 510 may include etch pits, such as silicon etch pits. These etch pits may be used in front-to-back lithography alignment, which allows the etch pits to be created on the bottom of the chips.

Thus, alignment of adjacent chips in optical module 500 may be facilitated by features on one or more surface of substrates 116 and/or alignment substrate 114. A given substrate may include one or more positive features 512 (which protrude or extend above a surrounding region on the surface of the given substrate) that are photo-lithographically defined using an additive process (i.e., a material-deposition) and/or a subtractive process (i.e., a material-removal). More generally, the positive feature(s) 512 may be added to the optical module (such as a ball) and, prior to assembly, may be separate from substrates 116. Consequently, positive features 512 may include: hemispheres, bumps or top-hat shapes, ridges, pyramids, truncated pyramids and/or balls (such as a microsphere).

Furthermore, alignment in optical module 500 is facilitated by mating the one or more positive features 512 with corresponding negative features 510. This 'snap-fit' assembly may provide and maintain precise alignment in a wafer-scale process, thereby facilitating low-cost assembly. Note that the one or more negative features 510 (which may be positioned below or recessed relative to a surrounding region on one or more surfaces of substrate 116 and/or alignment substrate 114) may be defined using an additive process and/or a subtractive process. Moreover, negative features 510 may include: slots, trenches, etch pits, pyramids, and/or truncated pyramids.

Positive and negative features may be fabricated using a wide variety of materials, including: a semiconductor, a metal, a glass, sapphire, and/or silicon dioxide. Furthermore, as noted previously, these features may be fabricated using additive and/or subtractive processes, including: sputtering, isotropic etching, and/or anisotropic etching. In some embodiments, positive and negative features are defined using photo-lithographic and/or direct-write techniques.

Figure 6:
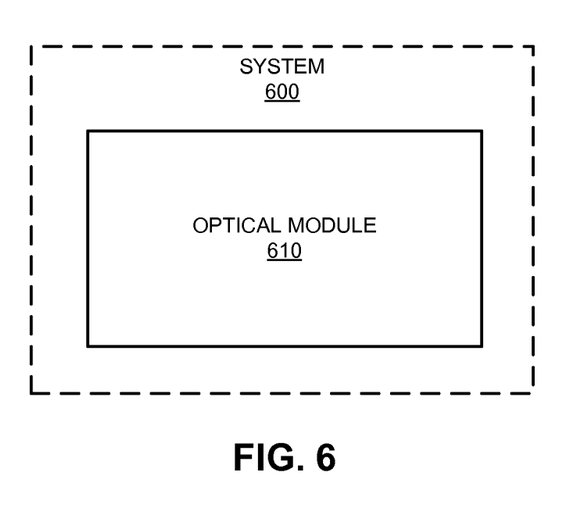
FIG. 6 is a block diagram illustrating a system in accordance with an embodiment of the present disclosure.

One or more of the preceding embodiments of the optical module may be included in a multi-chip module (MCM) and/or in a system. (The latter is shown in FIG. 6, which presents a block diagram illustrating a system 600 that includes an optical module 610.) In general, an MCM may include an array of chip modules (CMs) or single-chip modules (SCMs), and a given SCM may include at least one substrate, such as a semiconductor die. Note that an MCM is sometimes referred to as a 'macro-chip.' Furthermore, the substrate may communicate with other substrates, CMs, SCMs, and/or optical devices in the MCM using proximity communication of electromagnetically coupled signals (which is referred to as 'electromagnetic proximity communication'). For example, the proximity communication may include: communication of capacitively coupled signals ('electrical proximity communication') and/or communication of optical signals (such as optical proximity communication and/or edge-to-edge optical proximity communication). In some embodiments, the electromagnetic proximity communication includes inductively coupled signals and/or conductively coupled signals.

Furthermore, embodiments of the optical module and/or the MCM may be used in a variety of applications, including: VLSI circuits, communication systems (such as in wavelength division multiplexing), storage area networks, data centers, networks (such as local area networks), and/or computer systems (such as multiple-core processor computer systems). For example, the optical module may be included in a backplane that is coupled to multiple processor blades, or the optical module may couple different types of components (such as processors, memory, I/O devices, and/or peripheral devices). In some embodiments, an MCM that includes an optical module performs the functions of: a switch, a hub, a bridge, and/or a router.

Note that system 600 may include, but is not limited to: a server, a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Moreover, note that a given computer system may be at one location or may be distributed over multiple, geographically dispersed locations.

Optical module 100 (FIG. 1), optical module 200 (FIG. 2), optical module 300 (FIG. 3), optical module 400 (FIG. 4), optical module 500 (FIG. 5) and/or system 600 may include fewer components or additional components. For example, while the preceding embodiments use a single type of chip (such as a face-up chip) as an illustrative example, in other embodiments there are face-up and face-down chips. Face-down bridge chips may be aligned relative to the face-up chips in the optical devices using ball-in-pit packaging. These bridge chips may provide an auxiliary electrical proximity channel between the chips. Moreover, the face-up chips may occupy a substantially larger area than the face-down chips (or vice versa), thereby simplifying the packaging and cost of assembly. Furthermore, while the preceding embodiments use edge-to-edge optical proximity communication as an illustrative example, in some embodiments optical coupling to a given chip may include surface-normal coupling via a mirror or a grating coupler (i.e., optical proximity communication).

Although the optical modules in FIGS. 1-5 are illustrated as having a number of discrete items, these optical modules are intended to be functional descriptions of the various features that may be present rather than structural schematics of the embodiments described herein. Consequently, in these embodiments two or more components may be combined into a single component, and/or a position of one or more components may be changed.

Figure 7:
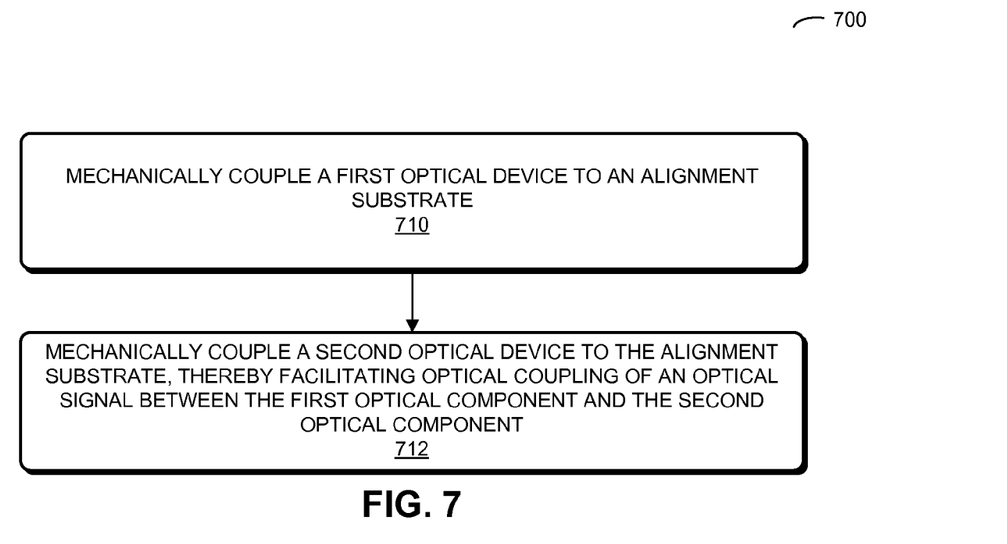
FIG. 7 is a flow chart illustrating a process for fabricating an optical device in accordance with an embodiment of the present disclosure.

We now describe embodiments of a process. FIG. 7 presents a flow chart illustrating a process 700 for assembling an optical module, such as one of the preceding embodiments of the optical module. During this process, a first optical device is mechanically coupled to an alignment substrate (operation 710). Moreover, the first optical device includes a first substrate having a first surface and a first edge, which is substantially perpendicular to the first surface, and a first optical component disposed on the first surface. Then, a second optical device is mechanically coupled to the alignment substrate (operation 712), where the second optical device has a second edge, which is substantially parallel to the first edge, and the second optical device includes a second optical component. Note that the alignment substrate aligns the first edge and the second edge, thereby facilitating optical coupling of the optical signal between the first optical component and the second optical component along the direction that is substantially perpendicular to the first edge and the second edge.

In some embodiments of process 700, there are additional or fewer operations. Moreover, the order of the operations may be changed, and/or two or more operations may be combined into a single operation.

The foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art. Additionally, the above disclosure is not intended to limit the present disclosure. The scope of the present disclosure is defined by the appended claims.

What is claimed is:
1. An optical module, comprising:
a first optical device that includes a first substrate and a first optical component, wherein the first substrate has a first surface and a first edge, wherein the first edge is substantially perpendicular to the first surface, and wherein the first optical component is disposed on the first surface;

a second optical device that includes a first connector, a second connector, and a fiber ribbon between the first and the second connector, wherein optical fibers for the fibber ribbon are attached to the first and the second connector, wherein the first connector has an edge that faces the first edge and is substantially parallel to the first edge, and wherein the second connector has an edge on another side of the second optical device than the first edge that is substantially parallel to the first edge;

a routing chip that includes a second substrate and a second optical component, wherein the second substrate has a second surface, a second edge, and a third edge on another side of the routing chip than the second edge, wherein the second edge and the third edge are each substantially perpendicular to the second surface and substantially parallel to the first edge, and wherein the edge for the second connector faces the second edge;

a third optical device that includes a third substrate and a third optical component, wherein the third substrate has a third surface and a fourth edge, wherein the fourth edge is substantially perpendicular to the third surface and substantially parallel to the third edge; and an alignment substrate, mechanically coupled to the first substrate, the second substrate, the third substrate, the first connector, and the second connector, wherein the alignment substrate is configured to align the first edge with the edge for the first connector, the second edge with the edge for the second connector, and the third edge with the fourth edge, thereby facilitating an optical coupling of an optical signal between the first optical component and the third optical component through the fiber ribbon and the second optical component, wherein the optical coupling is along a direction that is substantially perpendicular to the first and fourth edge.

2. The optical module of claim 1, wherein the first optical component and the second optical component are waveguides.

3. The optical module of claim 1, wherein the mechanical coupling of the first substrate and the alignment substrate is facilitated by a negative feature recessed below at least one of opposing surfaces of the first substrate and the alignment substrate; and
wherein the negative feature has an opening, defined by an edge, in at least one of the opposing surfaces.

4. The optical module of claim 3, wherein the mechanical coupling of the first substrate and the alignment substrate is facilitated by a positive feature that at least in part mates with the negative feature.

5. The optical module of claim 4, wherein the positive feature includes a spherically shaped mechanical coupling component.

6. The optical module of claim 3, wherein the mechanical coupling of the first substrate and the alignment substrate is facilitated by negative features recessed below both opposing surfaces of the first substrate and the alignment substrate; and
wherein the negative features have openings, defined by edges, in both of the opposing surfaces.

7. The optical module of claim 1, wherein the optical coupling occurs without mode converts at any of the first edge, the edge for the first connector, the edge for the second connector, the second edge, the third edge, and the fourth edge.

8. The optical module of claim 1, wherein the routing chip is configured to route the optical signal from the second optical device to the third optical device.

9. The optical module of claim 1, wherein the optical coupling comprises:

a first optical coupling of the optical signal between the first optical component and the fiber ribbon, wherein the first optical coupling is along a direction that is substantially perpendicular to the first edge and the edge for the first connector, a second optical coupling of the optical signal between the second optical component and the fiber ribbon, wherein the second optical coupling is along a direction that is substantially perpendicular to the second edge and the edge for the second connector, and a third optical coupling of the optical signal between the second optical component and the third optical component, wherein the third optical coupling is along a direction that is substantially perpendicular to the third edge and the fourth edge.

10. The optical module of claim 9, wherein the first optical coupling comprises an edge-to-edge coupling between the first edge and the edge for the first connector that allows light to be directly coupled between the first edge and the fibber ribbon,
wherein the second optical coupling comprises an edge-to-edge coupling between the edge for the second connector and the second edge that allows light to be directly coupled between the second edge and the fiber ribbon, and
wherein the third optical coupling comprises an edge-to-edge coupling between the third edge and the fourth edge that allows light to be directly coupled between the third edge and the fourth edge.

11. The optical module of claim 10, wherein, when a set of components is on top of the alignment substrate, each component in the set is entirely on top of the alignment substrate so that no part of the component is below any surface of the alignment substrate, and
wherein the set of components comprises the first substrate, the second substrate, the third substrate, the first connector, and the second connector.

12. The optical module of claim 11, wherein the first edge is different from a surface of the routing chip that includes active electronics,
wherein the first edge is different from a surface of the third optical device that includes active electronics,
wherein the first substrate is separate from the second substrate, the third substrate, and the alignment substrate,
wherein the second substrate is separate from the third substrate and the alignment substrate,
wherein the third substrate is separate from the alignment substrate,
wherein the connector for the first edge is separate from the first substrate, the second substrate, and the third substrate, and
wherein the connector for the second edge is separate from the first substrate, the second substrate, and the third substrate.

13. The optical module of claim 12, wherein the optical signal travels from the first optical component, through the fiber ribbon, to the second optical component using the first edge, the edge for the first connector, and the edge for the second connector, and
wherein the optical signal travels from the second optical component to the third optical component using the third edge and the second edge.

14. The optical module of claim 12, wherein the alignment substrate is configured to align the first edge with the edge for the first connector by using at least one alignment feature that protrudes from or is recessed below a surface of the alignment substrate that is mechanically coupled to the first edge and the edge for the first connector,
  wherein the alignment substrate is configured to align the second edge with the edge for the second connector by using at least one different alignment feature that protrudes from or is recessed below a surface of the alignment substrate that is mechanically coupled to the second edge and the edge for the second connector.

15. The optical module of claim 12, further comprising a face-down chip that includes a substrate with a surface that comprises active electronics, wherein the surface for the face-down chip faces the first optical component and includes one or more pits,
  wherein the face-down chip is aligned with the first substrate by using pits defined on the first substrate, wherein the pits on the first substrate are aligned with corresponding pits on the substrate of the face-down chip by using balls that are inserted in the pits.

16. The optical module of claim 10, wherein the edge-to-edge coupling for the first optical coupling does not involve using mode converters at any of the first edge and the edge for the first connector,
  wherein the edge-to-edge coupling for the second optical coupling does not involve using mode converters at any of the second edge and the edge for the second connector, and
  wherein the edge-to-edge coupling for the third optical coupling does not involve using mode converters at any of the third edge and the fourth edge.

17. The optical module of claim 10, wherein the edge-to-edge coupling for the first optical coupling does not involve using any components between the first edge and the edge for the first connector,
  wherein the edge-to-edge coupling for the second optical coupling does not involve using any components between the second edge and the edge for the second connector, and
  wherein the edge-to-edge coupling for the third optical coupling does not involve using any components between the third edge and the fourth edge.

18. A system, comprising an optical module, wherein the optical module includes:
  a first optical device that includes a first substrate and a first optical component, wherein the first substrate has a first surface and a first edge, wherein the first edge is substantially perpendicular to the first surface, and wherein the first optical component is disposed on the first surface;
  a second optical device that includes a first connector, a second connector, and a fiber ribbon between the first and the second connector, wherein optical fibers for the fibber ribbon are attached to the first and the second connector, wherein the first connector has an edge that faces the first edge and is substantially parallel to the first edge, and wherein the second connector has an edge on another side of the second optical device than the first edge that is substantially parallel to the first edge;
  a routing chip that includes a second substrate and a second optical component, wherein the second substrate has a second surface, a second edge, and a third edge on another side of the routing chip than the second edge, wherein the second edge and the third edge are each substantially perpendicular to the second surface and substantially parallel to the first edge, and wherein the edge for the second connector faces the second edge;
  a third optical device that includes a third substrate and a third optical component, wherein the third substrate has a third surface and a fourth edge, wherein the fourth edge is substantially perpendicular to the third surface and substantially parallel to the third edge; and
  an alignment substrate, mechanically coupled to the first substrate, the second substrate, the third substrate, the first connector, and the second connector, wherein the alignment substrate is configured to align the first edge with the edge for the first connector, the second edge with the edge for the second connector, and the third edge with the fourth edge, thereby facilitating an optical coupling of an optical signal between the first optical component and the third optical component through the fiber ribbon and the second optical component, wherein the optical coupling is along a direction that is substantially perpendicular to the first and fourth edge.

19. The system of claim 18, wherein the mechanical coupling of the first substrate and the alignment substrate is facilitated by a negative feature recessed below at least one of opposing surfaces of the first substrate and the alignment substrate; and
  wherein the negative feature has an opening, defined by an edge, in at least one of the opposing surfaces.

20. A method for assembling an optical module, comprising:
  mechanically coupling a first optical device to an alignment substrate, wherein the first optical device includes a first substrate and a first optical component, wherein the first substrate has a first surface and a first edge, wherein the first edge is substantially perpendicular to the first surface, and wherein the first optical component is disposed on the first surface;
  mechanically coupling a second optical device to the alignment substrate, wherein the second optical device includes a first connector, a second connector, and a fiber ribbon between the first and the second connector, wherein optical fibers for the fibber ribbon are attached to the first and the second connector, wherein the first connector has an edge that faces the first edge and is substantially parallel to the first edge, and wherein the second connector has an edge on another side of the second optical device than the first edge that is substantially parallel to the first edge;
  mechanically coupling a routing chip to the alignment substrate, wherein the routing chip includes a second substrate and a second optical component, wherein the second substrate has a second surface, a second edge, and a third edge on another side of the routing chip than the second edge, wherein the second edge and the third edge are each substantially perpendicular to the second surface and substantially parallel to the first edge, and wherein the edge for the second connector faces the second edge; and
  mechanically coupling a third optical device to the alignment substrate, wherein the third optical device includes a third substrate and a third optical component, wherein the third substrate has a third surface and a fourth edge, wherein the fourth edge is substantially perpendicular to the third surface and substantially parallel to the third edge,
  wherein the alignment substrate is mechanically coupled to the first connector and the second connector, wherein the alignment substrate aligns the first edge with the edge for the first connector, the second edge with the edge for the second connector, and the third edge with the fourth edge, thereby facilitating an optical coupling of an optical signal between the first optical component and the third optical component through the fiber ribbon and the second optical component, wherein the optical coupling is along a direction that is substantially perpendicular to the first and fourth edge.

* * * * *

UNITED STATES PATENT AND TRADEMARK OFFICE
CERTIFICATE OF CORRECTION

PATENT NO. : 8,755,655 B2  
APPLICATION NO. : 12/564701  
DATED : June 17, 2014  
INVENTOR(S) : Krishnamoorthy et al.

Page 1 of 1

It is certified that error appears in the above-identified patent and that said Letters Patent is hereby corrected as shown below:

In the Specification

Column 6, line 28, delete "shock" and insert -- shock. --, therefor.

In the Claims

Column 9, line 4, in Claim 1, delete "fibber" and insert -- fiber --, therefor.

Column 10, line 20, in Claim 10, delete "fibber" and insert -- fiber --, therefor.

Column 11, line 54, in Claim 18, delete "fibber" and insert -- fiber --, therefor.

Column 12, line 38, in Claim 20, delete "fibber" and insert -- fiber --, therefor.

Signed and Sealed this  
Third Day of February, 2015

Michelle K. Lee  
*Deputy Director of the United States Patent and Trademark Office*